United States Patent [19]

Sewell et al.

[11] Patent Number: 4,858,351
[45] Date of Patent: Aug. 22, 1989

[54] WALL SECUREMENT SYSTEM

[76] Inventors: Charles P. B. Sewell; Michael J. B. Sewell; Margaret I. Sewell, all of 82 Cliff View Drive, Green Bay, Auckland, New Zealand

[21] Appl. No.: 888,526

[22] Filed: Jul. 22, 1986

[30] Foreign Application Priority Data

Jul. 23, 1985 [NZ] New Zealand .......................... 212840

[51] Int. Cl.⁴ ................................................ G09F 1/12
[52] U.S. Cl. .................... 40/152.1; 248/489; 248/497
[58] Field of Search ............ 40/10, 617, 152.1; 248/497, 489

[56] References Cited

U.S. PATENT DOCUMENTS

| | | | |
|---|---|---|---|
| 1,908,147 | 5/1933 | Hoegger | 248/489 |
| 2,299,443 | 10/1942 | Walmsley | 248/497 |
| 2,928,199 | 3/1960 | Novak | 40/152.1 |
| 3,946,512 | 3/1976 | Shapiro | 40/152.1 |
| 4,309,017 | 1/1982 | Slemmons | 248/497 |

Primary Examiner—Gene Mancene
Assistant Examiner—Wenceslao J. Contreras
Attorney, Agent, or Firm—Needle & Rosenberg

[57] ABSTRACT

The invention relates to a securing arrangement for securing an article, for example a painting in a frame, to a wall or surface. Engagement means are provided and are adapted to be mounted on or secured to the article. Mounting means are provided and are adapted to be attached to a wall or surface to which the article is to be mounted. The mounting means includes a location portion, such as for example a bore. The engagement means passes into the location portion to locate the engagement means and article relative to the mounting means and wall or surface. In one form the arrangement includes locking means to prevent unauthorized or desired removal of said article from said wall or surface.

9 Claims, 6 Drawing Sheets

WALL SECUREMENT SYSTEM

BACKGROUND OF THE PRESENT INVENTION

This invention relates to a securing arrangement and in particular to an arrangement whereby articles can be mounted and secured to another article and/or to a desired wall or surface, in a secure and efficient manner.

Up until this time, various methods and means have been used for securing and mounting articles to other articles or surfaces. For example, means and methods have been known for securing and locating articles of furniture to walls or the like. Further, various methods and means have been known and used for mounting pictures, frames, certificates and the like to walls and surfaces.

It has been well accepted for many years, that for example a picture or certificate frame may have attached thereto a hook or length of securing material or cord, a suitable clip or hook also being attached to for example a wall. The hooks or hook and cord then engage one with the other, so that the picture or certificate is held in a desired or predetermined position on the surface or wall.

It has also been known for some time to provide various arrangements for mounting such pictures and certificates, which involve various locking and security arrangements, so as to prevent as far as possible such certificates, pictures and the like being easily removed and stolen.

Up until this time there has been a particular serious problem with the removal of certificates, paintings, works of art and the like, which are generally held in a frame, from public buildings, hotels, apartments and the like. Especially for example in hotels, motels and apartments, it is often desired to have on show relatively high quality works of art. There is however always the problem that people may remove such works of art unless they are securely and effectively attached to the appropriate surface or wall.

The above are by way of example only, and the same problem also exists in so far as art galleries, offices, dwellings and the like are concerned. The problem also exists with articles of furniture, other works of art, cabinets and the like, although the problem is particularly serious in so far as works of art which are found in a frame, are concerned.

The present invention provides a securing arrangement which goes at least some way towards attempting to minimise these problems, and which at the very least provides the public with a useful choice.

Other objects of this invention will become apparent from the following description.

BRIEF SUMMARY OF THE PRESENT INVENTION

According to one aspect of the present invention there is provided a securing arrangement including an engagement plate and at least one mounting plate; said engagement plate being provided with means to secure the same to an article, having a primary bore extending therethrough, and including an engagement pin; wherein a first end of said engagement pin is engaged within a first end of said primary bore, a second end of said primary bore being left open; said mounting plate being provided with means to secure the same to a wall or surface to which said article is to be secured, and having a secondary bore extending therethrough; in use said engagement plate being secured to a predetermind portion of said article, such that said article covers said second open end of said primary bore and said mounting plate being secured to a predetermined portion of said wall or surface, such that said engagment pin is located within said secondary bore; subsequent movement of said article away from said wall or surface requiring a hole or opening to be made in said article at or adjacent said second open end of said primary bore, at a predetermined point on said article in order that said engagement pin may be moved through said primary bore, so as to become disengaged with said plate.

BRIEF DESCRIPTION OF THE ACCOMPANYING DRAWINGS

FIG. 1: is a partially exploded view of an arrangement according to one form of the present invention.

FIG. 2: is a further view of an arrangement according to one form of the present invention.

FIG. 3: is a further view of one form of the present invention.

FIG. 4: is a further partially exploded view of an arrangement according to a further form of the present invention.

FIG. 5: is a side view of an arrangement according to one form of the present invention.

FIG. 6: is a side view of a portion of a securing arrangement according to one form of the present invention.

DETAILED DESCRIPTION OF THE PREFERRED EMBODIMENT OF THE PRESENT INVENTION

This invention will now be described by way of example only, with reference to the mounting and hanging of works of art, paintings, certificates and the like. These works of art which are hereinafter referred to by way of example, are usually found in frames, such as for example frames of wood, plastic, metal and aluminium. These are by way of example only, and it should be appreciated, that the invention is described by way of example, with reference to such works of art being mounted in a frame, essentially having upper, lower, and side struts or bars. As referred to hereinbefore, it should be appreciated however, that the invention has application in other areas.

Figure 1:
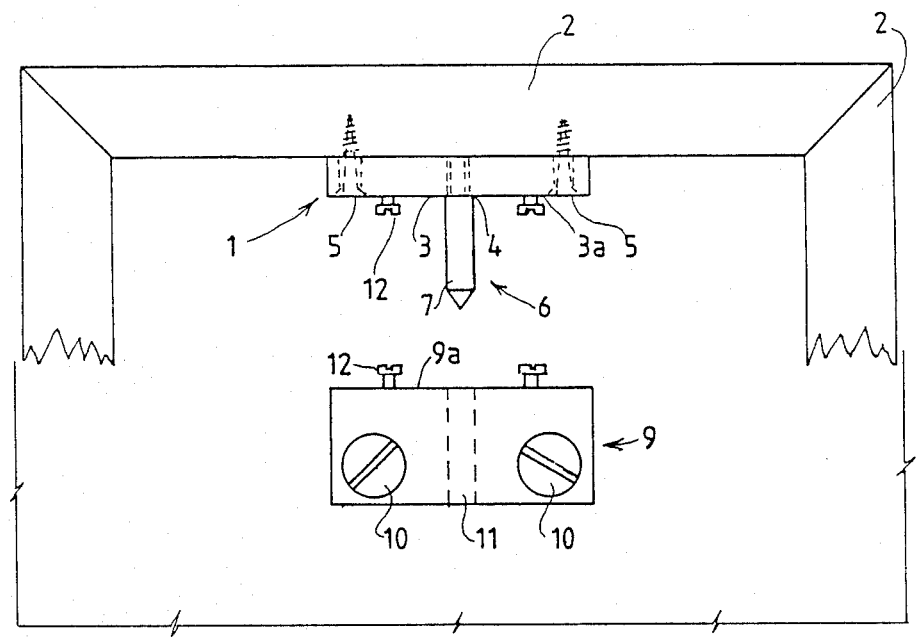

Referring to FIG. 1 of the drawings, the engagement pin 6 is shown as an elongate pin 6 of substantially regular cross-section. If desired however, the head 7 of the pin can be of an enlarged size. The engagement pin 6 is shown as being mounted to an engagement plate 3 which is secured to an underside of a frame member 2, such as by screws, nails and the like 5. The securing pin 6 can be adjustably engaged within a bore 4 of the securing plate 3. For example the inner surface of the bore 4 can be provided or formed with a screw thread, while an upper end 16 of the pin 6 can be provided with a substantially corresponding screw thread. In an alternative form of the invention, the securing pin 6 can be permanently located and engaged with the plate 3.

In a further form of the invention (not shown), the securing pin 6 can be adjustably or permanently secured to an underside of for example the frame member 2, so as to extend downwardly therefrom. While it is preferred that the securing pin 6 be engaged with or attached to a securing plate 3, it is envisaged that securing pins 6 could be adjustably or fixably attached to or mounted on frame portions of for example a picture or certificate frame. For example, a screw threaded bore could be provided on an underside of a frame portion and a securing pin 6 with an upper screw threaded portion, engaged therewith.

Referring further to FIG. 1 of the drawings, a mounting block 9 is provided which is a substantially rectangular metal block having screws passing therethrough which are adapted for example to be engaged with or secured to a wall or surface to which the frame is to be attached. Screws 10 are shown in the drawings as attaching the mounting block 9 to an appropriate wall or surface.

The mounting block 9 is preferably provided with an elongate location portion, in the form of an elongate bore passing therethrough.

Preferably the elongate bore 11 passes through the mounting plate 9, from top to bottom.

Figure 2:
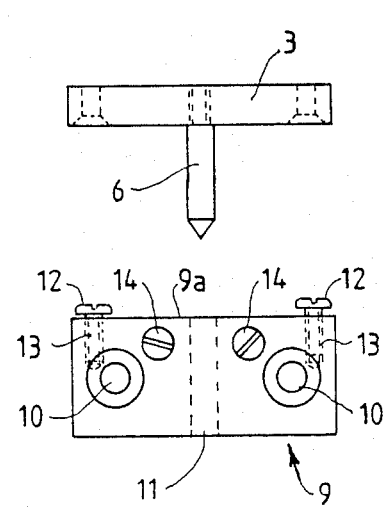
Figure 6:
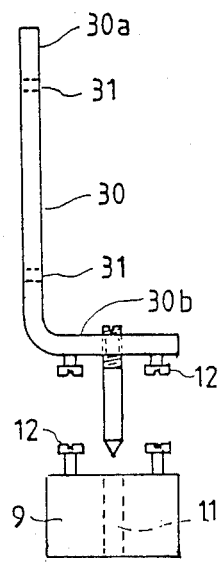

Referring to FIG. 2 of the drawings, adjustment means 14, in the form of screws passing through the block 9 can be provided. These screws 14 are in addition to the mounting means 10. The screws 14 extend outwardly from the reverse side of the mounting block 9 and can be adjusted inwardly and outwardly, so as to vary and determine the angle of the mounting plate relative to the desired wall or surface.

Further, the bore 11 can in one form of the invention be angled out from the wall at the top, and in towards the wall at the bottom, in order to assist as far as possible in keeping for example the foot of a picture or frame adjacent the wall. For example the angle may vary to approximately 7.5°, depending upon the tolerance between the engagement pin 6 and the bore 11; the length of the picture or article, and the pressure required between the foot of the picture and the wall. By way of example, a normal angle is about 1.5°.

Referring further to FIG. 2 of the drawings, adjustment means 12 are shown as being provided on an upper surface of the mounting plate 9. The adjustment means 12 are in the form of screw threaded pins or screws, having for example flat heads, which are able to be screwed or moved inwardly or outwardly of the upper surface of the mounting plate 9.

In the present invention it should be appreciated that while it may be preferred to provide adjustment means on an upper surface of the mounting plate 9, this is by no means essential. For example, as an alternative or an addition, adjustment screws could be provided extending downwardly from an underside 3 of the engagement plate 3a, or for example from an underside of the frame member 2. In the alternative, spaced apart and staggered adjustment means could be provided on both the underside 3a of the engagement plate 3 (or the frame 2) and the upper surface 9a of the mounting plate.

In use, once the engagement plate 3 and mounting plate 9 have been attached to a frame and wall respectively, or once an engagement pin 6 and mounting plate 9 have been engaged to a frame and wall respectively, the engagement pin 6 passes down through the bore 11 to locate and secure the frame relative to the wall or surface and the mounting plate 9.

The adjustment means 12 are used to vary and alter the angle or level of the picture, and to assist in keeping the picture as level as possible. By way of example, the adjustment means 12 can be moved inwardly or outwardly of the upper surface of the plate 9, so that the lower surface of the engagement plate 3 or alternatively the lower surface of the frame member 2, will abut thereagainst, thus giving the picture of a desired angle or level.

If desired only one such adjustment means 12 can be provided, although preferably there are two such spaced apart adjustment members. If desired, more can be provided. Each adjustment member 12 is independently adjustable.

Figure 3:
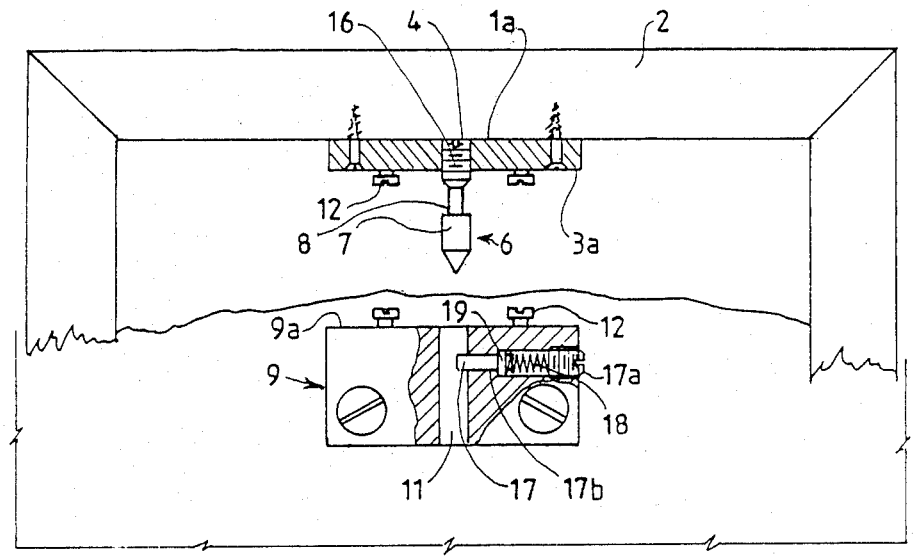

Referring now to FIG. 3 of the accompanying drawings, the engagement pin 6 can again be engaged with engagement plate 3 or can be engaged directly within a hole or bore provided in a frame member 2.

In the form of the invention shown in FIG. 3 of the drawings, an upper end 16 of the engagement pin 6 is screw threaded and engages within a screw threaded bore 4 in the mounting plate 3, or a screw threaded bore provided in the frame 2.

Preferably, the engagement pin 6 has an enlarged head portion 7 and a shank 8 of reduced cross section.

The form of the invention shown in FIG. 3 includes locking means, in the form of spring biased locking means 17 which at least partially extend into the bore 11. The locking means is preferably in the form of a locking pin 17 located in a bore 20 which is spring biased inwardly, by means of a spring 18 which biases against a spring plate 19 and against an underside of a screw member 17a. Adjustment of the screw member 17a will depress the spring 18 and determine the amount that the locking pin 17 will extend into the bore 11. The adjustment will however be such that pressure being applied to the locking pin 17, it will be able to depress inwardly, thus freeing the bore 11 for passage. The bore 17b is, in one form of the invention, located substantially transverse to the longitudinal axis of the bore 11. More than one locking means 17 can be provided if desired.

Thus, on the engagement pin 6 being screw threaded into the bore 4 of the engagement plate 3, or being screw threaded into a screw threaded bore in the frame 2, the engagement pin 6 and enlarged head portion thereof will be passed down into the bore 11. The passage of the enlarged head portion (7) will cause the spring biased locking pin 17 to be depressed, against the spring bias, thus allowing the head portion (7) passage through the bore 11. Once the head has passed the locking pin 17, the locking pin 17 will be caused to be spring biased back into a position in which it extends into the bore 11, behind the head portion 7 (as shown by way of example in FIG. 4 of the drawings).

The locking pin 17 will therefore extend over the enlarged head portion 7 and will prevent the frame and engaging plate (or engaging pin 6) being axially removed from the mounting plate (9) and wall or surface to which the mounting plate is attached. Normally, a person wishing to remove a painting or work of art, would attempt to move the frame upwardly and outwardly of the wall or surface to which it is mounted. Such action will be prevented or substantially minimised by the arrangement of the present invention.

When it is desired to remove a painting or article, a hole is for example bored in the upper surface of the frame 2, immediately above or adjacent the bore 4 or location of the upper screw threaded portion 16 of the engagement pin 6. Appropriate markings are provided to indicate the location. A small screwdriver or similar operating device is then used to screw the threaded portion 16 of the pin 6 out of the screw threaded bore 4. If the engagement pin 6 is engaged directly with the frame, a hole can be bored in the frame to align with the lower hole on the underside, in which the upper end of the pin 6 is engaged. Alternatively a hole may pass therethrough. In either case, a small screwdriver or instrument is used to screw the threaded end 16 and pin 6 out of the screw threaded hole (be it in the plate 3 or in the frame 2), to disengage from the plate 3 and/or the frame 2 from the mounting plate 9. The pin 6 (and/or plate 3) and plate 9 are then disengaged. The engagement pin 6 is then capable of being drawn out of the bore 11, by the area of reduced diameter merely passing through and past the locking pin 17.

If desired, various components of the arrangement can be electrified, or can be connected to a source of electric power, so as to have current running therethrough. Preferably they are also connected to an appropriate alarm, such as for example a flashing light, siren or the like. If desired, the components can also be attached to the reverse side of for example the painting or frame, and the painting and frame can also be attached to the wall or surface. Thus, on the contacts being broken, an alarm will be actuated, thus providing warning.

Figures 4, 5:
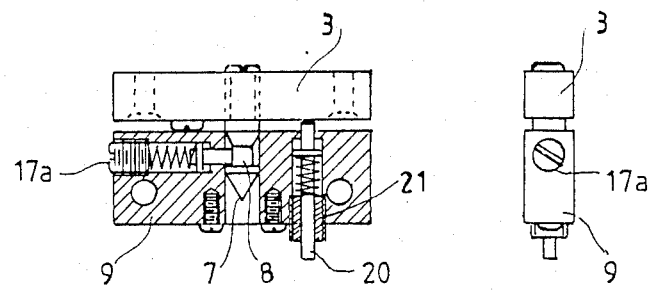

Referring by way of example to FIG. 4 of the drawings, one provide additional strength and security.

To assist in locating the strut 30 in position, appropriate mounting blocks 9 are provided which are provided with a recess location portion 11 therein, through which the pin passes. Adjustment pins 12 can be provided on the upper surface of the mounting block 9 and/or on the underside of the foot 30b, such adjustment means being movable towards and away from the mounting block 9 and/or the underside of the foot 30b. These therefore allow for adjustment of the level of the struts 30 and the frame or picture to which they are attached.

It should be appreciated that this invention has been described by way of example only, and that improvements and modifications may be made thereto without departing from the scope thereof, as defined by the appended claims.

We claim:

1. A securing arrangement including an engagement plate and at least one mounting plate; said engagement plate being provided with means to secure the same to an article, having a primary bore extending therethrough, and including an engagement pin; wherein a first end of said engagement pin is engaged within a first end of said primary bore, a second end of said primary bore being left open; said mounting plate being provided with means to secure the same to a wall or surface to which said article is to be secured, and having a secondary bore extending therethrough; in use said engagement plate being secured to a predetermined portion of said article, such that said article covers said second open end of said primary bore and said mounting plate being secured to a predetermined portion of said wall or surface, such that said engagement pin is located within said secondary bore; subsequent movement of said article away from said wall or surface requiring a hole or opening to be made in said article at or adjacent said second open end of said primary bore, at a predetermined point on said article in order that said engagement pin may be moved through said primary bore, so as to become disengaged with said plate.

2. A securing arrangement as claimed in claim 1, wherein said first end of said engagement pin is screw threaded, and wherein said primary bore is at least partially screw threaded.

3. An arrangement as claimed in claim 1, wherein said first end of said engaging pin is screw threaded, said primary bore is at least partially screw threaded, and wherein a second end of said pin is provided with an enlarged head portion; spring loaded locking means being provided and extending at least partially into said primary bore.

4. A securing arrangement as claimed in claim 1, wherein said mounting plate includes means to adjust the position of said plate relative to said surface or wall to which said article is to be secured.

5. A securing arrangement as claimed in claim 2, wherein one or more components of said arrangement are connected to or provided with one or more electrical contact means, such that on said one or more contact means completing or breaking a circuit, alarm means are actuated.

6. A securing arrangement as claimed in claim 3, wherein said spring loaded locking means is in the form of an elongate pin located within a further bore in said mounting plate; said further bore being substantially transverse to the longitudinal axis of said primary bore; adjustment means being provided to control the intrusion of said locking means into said primary bore.

7. A securing arrangement as claimed in claim 1, wherein adjustment means are provided on an upper surface of said mounting plate; said adjustment means being capable of movement toward and away from said upper surface; the arrangement being such that in use, said adjustment means allow for the adjustment of the angle or level of said article being mounted.

8. A securing arrangement as claimed in claim 1, wherein said engagement plate is in the form of a substantially "L" shaped plate, said engagement pin extending downwardly from an outwardly extending foot of said "L" shaped plate.

9. A securing arrangement as claimed in claim 1, wherein adjustment means are provided on a lower surface of said engagement plate, said adjustment means being capable of being moved toward and away from said engagement plate.

* * * * *